Sept. 19, 1967 R. W. BRUNDAGE 3,342,046
WASHING MACHINE
Filed Feb. 23, 1966 3 Sheets-Sheet 1
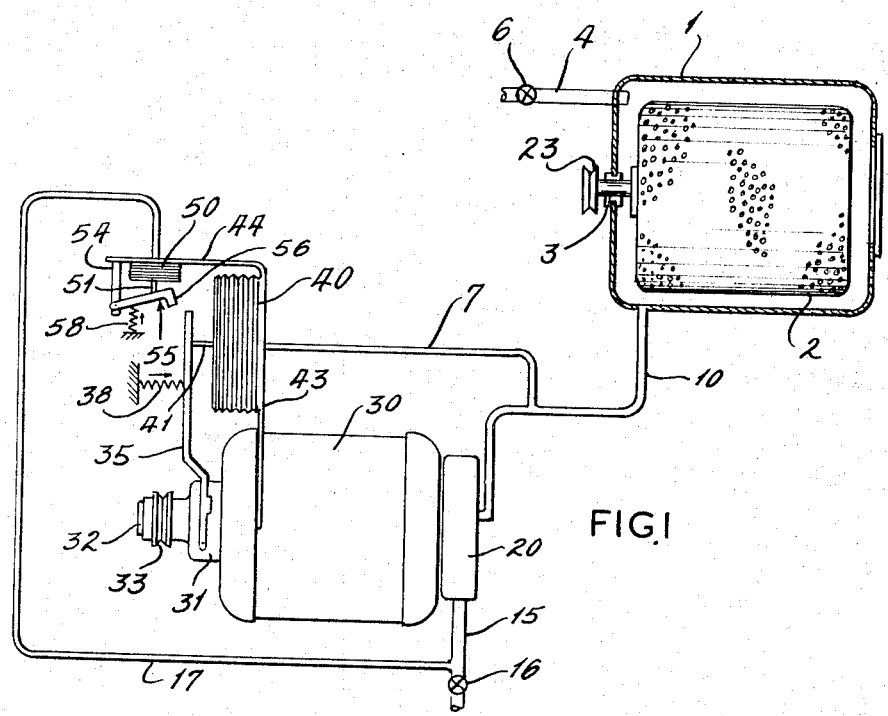
FIG.1
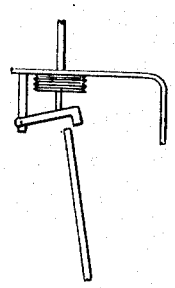
FIG.2
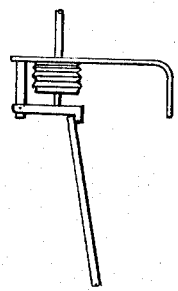
FIG.3
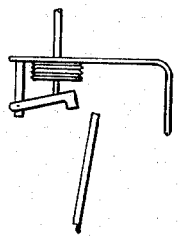
FIG.4
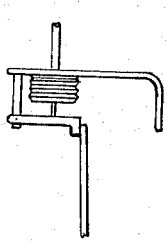
FIG.5
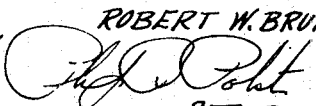
INVENTOR:
ROBERT W. BRUNDAGE
BY
ATTORNEY.

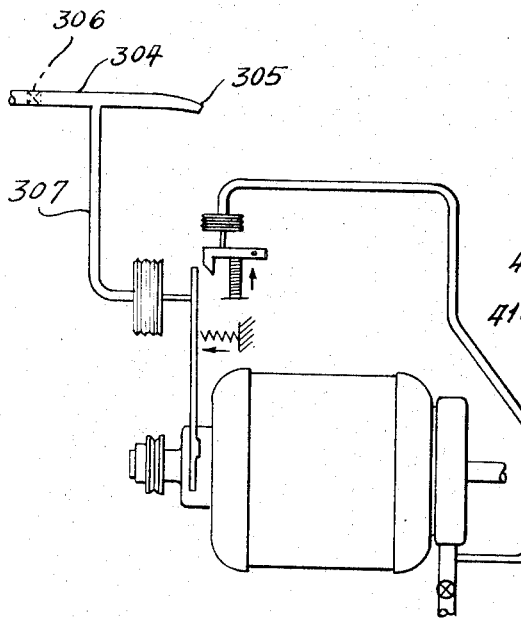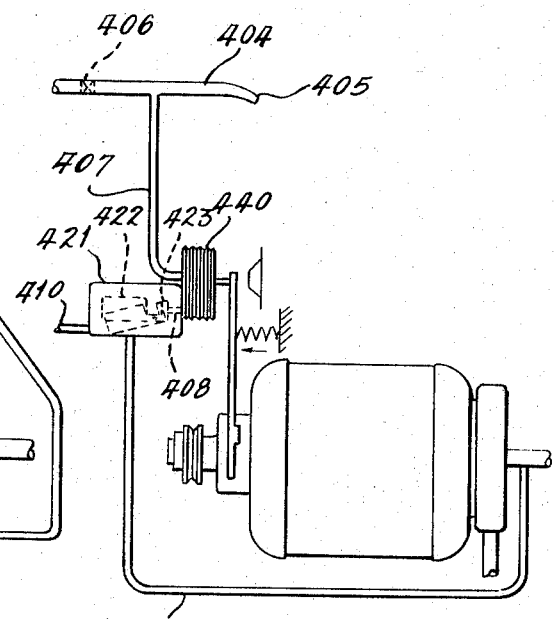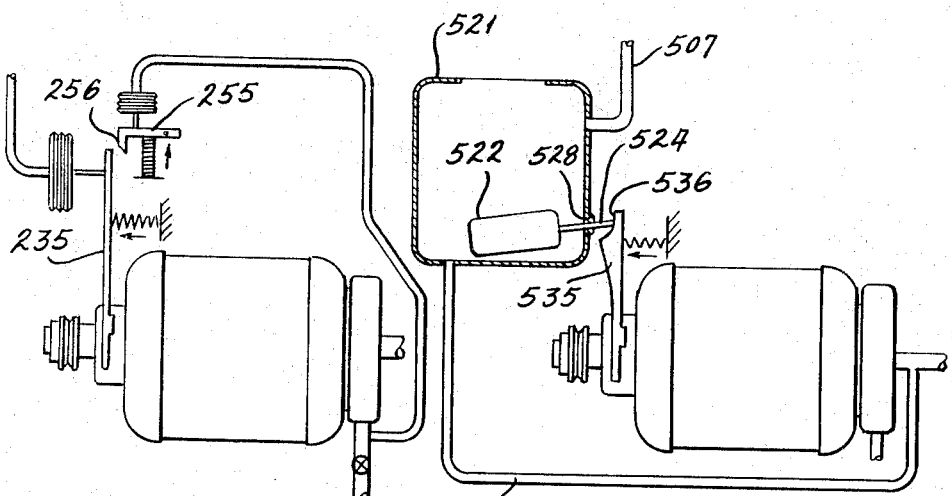

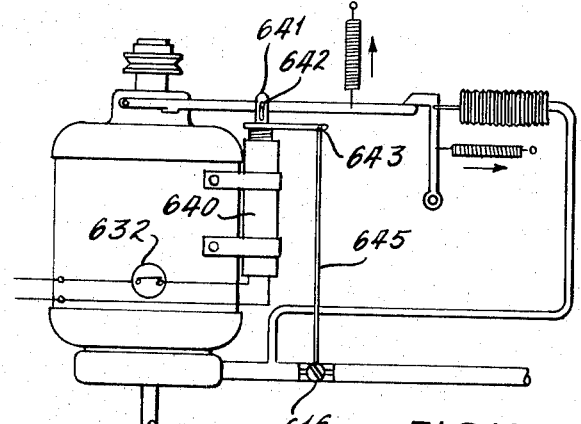
FIG.10
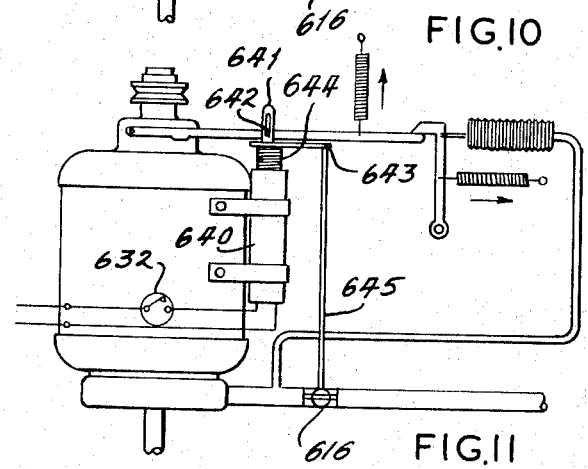
FIG.11
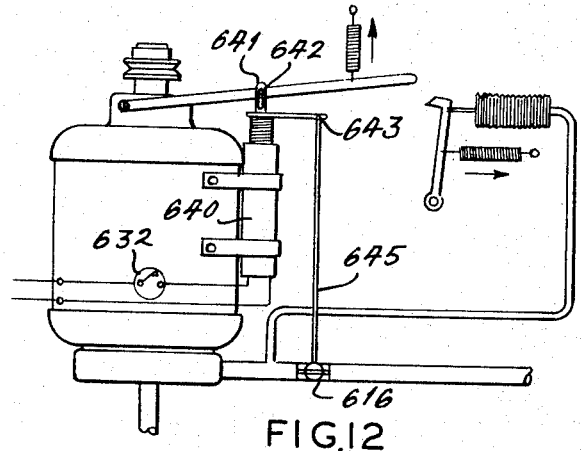
FIG.12
INVENTOR:
ROBERT W. BRUNDAGE
BY 
ATTORNEY

United States Patent Office 3,342,046
Patented Sept. 19, 1967

3,342,046
WASHING MACHINE
Robert W. Brundage, Belnor, Mo., assignor to Emerson Electric Co., St. Louis, Mo., a corporation of Missouri
Filed Feb. 23, 1966, Ser. No. 529,468
6 Claims. (Cl. 68—24)

ABSTRACT OF THE DISCLOSURE

A tub for the reception of water, a filling conduit by which water is conveyed to the tub and a drain by which water is conveyed from the tub, an electric motor connected to a variable speed transmission and an output shaft from the transmission to drive the washing machine; a mechanical shifting device connected to the transmission to cause the transmission output shaft to drive the machine at one position of the shifting means at tumble speed and at another, at spin speed. A hydraulic means communicating with the water system (tub, filling conduit or drain) to control the movement of the shifting device. An interlock operator mechanically coupled to a mechanical interlock selectively to restrain movement of the shifting means until enough water has been drained from the tub to make it safe for the shifter to move to the spin position.

Background of the invention

This invention relates to washing machines of the type in which the machine is driven at a relatively slow, "tumble" speed, and a higher, "spin" speed. It relates particularly to such a machine in which the two speeds are accomplished through a transmission provided with a mechanical shifting element.

One of the objects of this invention is to provide a simple, direct acting shifting operator and control in a wash machine of the two speed transmission type.

Other objects will become apparent to those skilled in the art in the light of the following description and accompanying drawing.

Summary of the invention

In accordance with this invention, generally stated, in a washing machine having a tub for the reception of water, a filling conduit by which water is conveyed to the tub and a drain by which water is conveyed from the tub, the filling conduit, tub, and drain being parts of the water system of the machine, and wherein a driving means such as an electrical motor is connected to a variable speed transmission and an output shaft from the transmission is connected to drive the washing machine, and a mechanical shifting device is operatively connected to the transmission for causing the transmission output shaft to drive the washing machine selectively at one position of the shifting means at tumble speed and at another position of the shifting means at spin speed, a hydraulic means is provided operatively communicating with the water system of the machine and with water in the water system and so connected and arranged as to control the movement of the shifting device.

In the preferred embodiment, a main hydraulic shifter in the form of a bellows is connected to communicate with the tub and is mechanically coupled to the shifting device to move it from spin to tumble position. An interlock operator, also in the form of a bellows, is connected to a discharge pipe from the tub so as to utilize water from the tub in its operation, and is mechanically coupled to a mechanical interlock adapted selectively to restrain movement of the shifting means in response to the bias of the main hydraulic shifter, until enough water has been drained from the tub to make it safe for the shifter to move to the spin position. In particular, in the preferred embodiment, the interlock operator is operatively connected to the discharge side of a water pump, the suction side of which is connected to a drain from the tub, to ensure operation of the interlock until substantially all of the free water has been removed from the tub, and the pump begins sucking air.

In other embodiments, the hydraulic means includes a main hydraulic shifter connected to the filling conduit and an interlock operator connected to the discharge side of a water pump, or only a main shifter in the form of a float-actuated operator, communicating with the tub, or only an interlock operator.

Brief description of the drawing

In the drawing,

FIGURE 1 is a somewhat schematic view, partly in section but chiefly in side elevation, of one embodiment of the washing machine of this invention;

FIGURE 2 is a fragmentary view in side elevation showing a shifter and interlock operator of the device shown in FIGURE 1, in their position when the tub has water in it, but the water pump is not running, i.e., in the filling condition;

FIGURE 3 is a view corresponding to the view shown in FIGURE 2, but showing the shifting device and interlock operator in their position after the pump has started, while there is water in the tub;

FIGURE 4 is a view corresponding to the view shown in FIGURES 2 and 3, showing the shifting device and interlock operator in their positions when the tub is empty, the shifter being in the spin position;

FIGURE 5 is a view corresponding to the view shown in FIGURES 2–4, showing the position of the shifting device and interlock operator in the unusual circumstance in which water is spun from the clothes in sufficient quantity to affect the main hydraulic shifter;

FIGURE 6 is a view in side elevation, corresponding to the view shown in FIGURE 1 but without the tub, of another embodiment of washing machine of this invention;

FIGURE 7 is a view in side elevation corresponding to the view shown in FIGURE 1 but without the tub, of still another embodiment of the washing machine of this invention;

FIGURE 8 is a view in side elevation, corresponding to the view shown in FIGURE 1 but without the tub, of still another embodiment of the washing machine of this invention;

FIGURE 9 is a view, partly in section and partly in side elevation, showing still another embodiment of the washing machine of this invention, without the tub;

FIGURE 10 is a top plan view of still another embodiment of the washing machine of this invention, without the tub, showing the device in tumble condition;

FIGURE 11 is a top plan view of the device shown in FIGURE 10, showing the device in drain-tumble condition; and FIGURE 12 is a top plan view corresponding to the view shown in FIGURES 10 and 11, showing the device in spin condition.

Description of the preferred embodiment

Referring now to the drawing, and particularly to FIGURES 1–5, for one illustrative embodiment of the washing machine of this invention, reference numeral 1 indicates a washing machine tub, of the horizontal type, with a basket 2 inside the tub revolvably mounted on a shaft 3 which projects outside the tub.

A filler conduit 4, with a solenoid operated filler valve 6 in it, delivers water under pressure to the tub when the valve 6 is opened. A drain line 10 communicates at the bottom of the tub 1 with the inside of the tub 1, and with the suction side of a centrifugal water pump 20, mounted on an end shield of a motor 30. A discharge pipe 15 communicates with the discharge side of the pump 20, and forms, in effect, a continuation of the drain pipe 10. The discharge line 15 has in it a solenoid operated valve 16. An interlock operator pipe 17 is connected to the discharge pipe 15, between the pump and the valve 16. A main shifter pipe 7 is connected to and communicates with the drain line 10 between the tub and the suction side of the pump 20.

A transmission 31 is mounted on the end shield of the motor 30 opposite the pump 20. A shifting lever 35 is connected to the transmission in such a way that in the position shown in FIGURES 1, 4, and 5, the transmission acts to drive an output shaft 32, hence a sheave 33, at a rapid rate, to produce a spin speed in the tub 2, to which the sheave 33 is connected by means of a V-belt not here shown and a sheave 23 on the shaft 3 shown somewhat schematically in FIGURE 1. In the position of the shift lever 35 shown in FIGURES 2 and 3, the transmission 31 acts to drive the output shaft 32, hence the tub 2, at a slower, tumble speed. The construction of the transmission itself forms no part of this present invention. A suitable transmission is described in my copending patent application Ser. No. 452,194, filed Apr. 30, 1965.

In the illustrative embodiment shown in FIGURE 1, a compression spring 38 is shown as biasing the shifting lever 35 continuously toward the spin position. In practice, the spring 38 will be inside the housing of the transmission.

A link 41 is connected at one of its ends to the shifting lever 35, and at its other end to the center of an end wall of a main shifter bellows 40. The bellows 40 is shown as mounted on and with an end wall against a mounting bracket 43, carried by the motor 30. The end wall of the bellows 40 against the bracket 43 is connected to the shifter pipe 7, so that the shifter pipe 7 communicates with the inside of the bellows 40.

The bracket 43 is inverted L-shaped, with a foot 44 projecting at right angles to the planes of the end walls of the main shifter bellows 40.

An interlock operator bellows 50 is mounted on and with an end wall against the underside of the foot 44, through which an end of the interlock pipe 17 extends to communicate with the interior of the interlock operator bellows 50. An interlock stanchion 54 is mounted at one end on the foot 44. An L-shaped interlock 55 is pivotally mounted at the free end of its stem on the stanchion 54. At its other end, a stop foot 56 is directed toward the lever 35. The interlock 55 is pivotally connected to a link 51 which is in turn connected to an end face of the bellows 50 on the end of the bellows opposite the foot 44. A spring 58, shown schematically as a compression spring, biases the interlock 55 in a direction away from the lever 35 and toward the interlock bellows 50.

In the operation of this embodiment of the washing machine, assuming that the tub 1 is empty and the basket 2 has a load of clothes in it, ready for washing, the filler conduit 4 is connected to a source of water, and the valves 6 and 16 are closed.

When the washing machine cycle is started, the valve 16 remains closed and the valve 6 is opened electrically to admit water to the tub. As the water rises in the tub, it fills the drain pipe 10, the pump 20, the discharge pipe 15 and the main shifter pipe 7, and the interlock operator pipe 17. It also fills the main shifter bellows 40 and the interlock operator bellows 50. The head of water in the tub 1 is insufficient to cause the interlock operator bellows 50 to force the interlock 55 down against the bias of the spring 58. The head of water in the tub 1 is, however, ample to cause the larger main shifter bellows 40 to move the shift lever 35 against the bias of the spring 38 to the position shown in FIGURE 2, which is the tumble position. When the water in the tub 1 has reached the desired level, the electrical control system shuts off the valve 6 and starts motor 30, to start the tumble of the basket 2. At the same time, the running of the motor 30 causes an impeller in the pump 20 to turn, building up pressure in the pipe 17 and bellows 50, forcing the interlock 55 to move against the bias of the spring 38 to the position shown in FIGURE 3.

When the clothes have tumbled for a sufficient time the control causes the solenoid drain valve 16 to open, which permits the pump 20 to pump out the water from the tub 1. However, the capacity of the pump and restriction through the valve 16 are such that as long as there is any water in the drain pipe 10, the pump 20 will maintain sufficient pressure on the interlock operator bellows 50 to hold the interlock in the position shown in FIGURE 3, which ensures that the lever 35 cannot move from the tumble position. When the pump 20 begins to suck air, the pressure on the interlock bellows 50 drops, the bellows moves upward with the bias of the spring 58, to release the shifting lever 38, and permit it to move to the position shown in FIGURE 4, which is the spin position. Should there be enough water spun from the clothes, to move the shift lever 35 toward the tumble position, the same head of water, through the pump 20, will put the interlock 55 in the position shown in FIGURE 5, which will restrain the shift lever 35 from moving to the tumble position. This latter situation is an extraordinary one and will last only momentarily, since the pump 20 ordinarily will clear the tub of water as it is spun out of the clothes, without building up any appreciable head of water. When the spin cycle is finished, the motor 30 is turned off and the valve 16 closed. Rinse cycles are merely repetitions of the wash cycle as far as the operation of the main shifter and interlock are concerned.

The embodiment of the washing machine shown in FIGURE 6 is similar to the one shown in FIGURE 1, except for two differences. First, the spin and tumble positions of a shift lever 235 are reversed from those of the shift lever 35 of the embodiment shown in FIGURE 1. Second, a foot 256 of an interlock 255 is chamfered on its edge nearest the lever 235, as distinguished from the square foot 56 on the interlock 55 of the embodiment shown in FIGURE 1. Otherwise the construction of the two embodiments is the same, and their operation is much the same but for the fact that the condition shown in FIGURE 5 will not obtain because the camming action of the lever 235 on the chamfered part of the foot 255 will lift the interlock 255 against the force of the interlock operating bellows to put the shift lever 235 into the position corresponding to that of the lever 35 in FIGURE 3. While this does not provide against the unusual situation described in connection with FIGURE 5, the advantage of the provision of the camming surface is that the motor can be started at the beginning of the filling process, since the shifting lever 235 will merely cam under the foot 255 which will then snap down into place to hold the lever 235 in tumble position.

In the embodiment of the washing machine shown in FIGURE 7, all of the parts shown in FIGURE 6 have their exact counterparts in FIGURE 7, the difference in the embodiments being that a main shifter pipe 307 is connected to and communicates wtih a filler conduit 304 between a solenoid operated valve 306 and a restricted filling nozzle 305. In the operation of the embodiment of the washing machine shown in FIGURE 7, when the filling valve 306 is opened, the pressure of the water in the conduit 304 by virtue of the restriction of the nozzle 305 causes the bellows to move the shifting lever to the tumble position, whether the motor is running or not, since if the motor is running the shifting lever will merely cam under the interlock foot which will then snap down into holding position. In any event, the motor must be started before the filling process is complete, to hold the interlock into position. As in the first embodiments described, the interlock will hold the shift lever in tumble position until the pump begins to suck air, when the interlock will move away to permit the shift lever to move to spin position.

In the embodiment shown in FIGURE 8, the motor, pump, transmission, output shaft and shifting lever are all identical with those components of the embodiments shown in FIGURES 6 and 7. As in the embodiment shown in FIGURE 7, a main shifter bellows 440 communicates with a filler conduit 404, between a valve 406 and a restricted filling nozzle 405. However, in the embodiment shown in FIGURE 8, a filler-stand pipe 407 is of sufficient height to maintain a head of water in the bellows 440 which will hold the shift lever in the tumble position when the filler-stand pipe 407 is full. A bleeder nipple 408 communicates at one end with the interior of the bellows 440 and projects at its other end into and is sealed into a wall of a float tank 421. The nipple 408 is part of a float valve, the rest of which consists of a float 422 pivoted on a horizontal pivot in the float tank, and a valve leaf 423, connected to the float 422 and so positioned wth respect to the nipple 408 as to move between seating (and sealing) position against the mouth of the nipple 408 and a position removed from the mouth of the nipple so as to unblock it. The float tank 421 communicates, through a line 410 with the tub, not here shown, and, through a tank drain line 417, with the suction side of the pump.

In the operation of this embodiment of the washing machine, the motor is not energized during the filling process, and the bellows 440 is filled only after the level of water in the tub reaches a height at which the float 422 rises to seat the valve leaf 423 against the nipple 408. When this happens, the bellows 440 fills with water, and the head of water in the filler-stand pipe is sufficient, with the pressure in the conduit 404, to move the shifting lever to the tumble position. As has been indicated heretofore, the static head of water in the filler-stand pipe 407 is enough to keep the lever in the tumble position. When, on the remaining portion of the cycle, the level of water in the tub has fallen to the place at which the level of water in the float tank 421 permits the float to move down and the valve leaf 423 to move away from the nipple 408, the water will then drain out of the bellows 440 and filler-stand pipe 407, permitting the lever to move to the spin position.

The embodiment of the washing machine shown in FIGURE 9 utilizes the same motor, pump, transmission and output shaft as the embodiments shown in FIGURES 6–8. However, a shift lever 535 is provided with a cam surface 536 engaged by an end of a shifter rod 524. The shifter rod 524 is pivoted in a float tank 521 and projects from the tank through a flexible seal 528. The end of the shifter rod 524 inside the tank is rigidly connected to a float 522. A float tank filling tube 507 communicates at one end with the float tank 521 and at the other with a tub not here shown. A float tank drain line 517 communicates at one end with the float tank 521 and at its other, with the suction side of the water pump.

In the operation of this embodiment of the washing machine, as the tub is filled, the filling water, coming into the float tank 521 through the line 507, causes the float 522 to rise, moving the outer end of the rod 524 against the cam surface 536, forcing the shifting lever 535, against the bias of a compression spring, to the tumble position. When the tub is emptied by the pump, the float 522 falls to the position shown in FIGURE 9, and the shifting lever 535 moves, under the bias of the spring, to the spin position. It can be seen that this arrangement is by no means the preferred embodiment. The movement of the shifting lever 535 tends to be more gradual even than the movement of the lever in the embodiment shown in FIGURE 8. In the other embodiments, the movement from tumble to spin is abrupt, when the interlock releases the lever. Some improvement in the action of the shifting mechanism in the embodiment shown in FIGURE 9 can be obtained by using the rod 524 to actuate a toggle or other over-centering device, to produce a more abrupt movement of the shifting lever.

In the embodiment of the washing machine illustrated in FIGURES 10, 11, and 12, the motor, pump, transmission, output shaft, and shifting lever are all identical with those of FIGURES 6–8. The interlock and interlock operating bellows, and the communication of the interlock operating bellows and the discharge pipe between the pump and a valve, are also essentially the same as those elements of the embodiments shown in FIGURES 6 and 7.

In the embodiments shown in FIGURES 10–12, however, a solenoid 640 is mounted on the motor. The solenoid 640 has a movable core with a shifter bar 641 at its outer end. The shifter bar 641 has an elongated slot in it, in which a pin 642 is slidably mounted. The pin 642 is secured to the shifting lever. A valve lever bracket 643 is mounted on the movable core, between the solenoid casing and the shifter bar 641. A helical compression spring 644 is mounted around the movable core, between the housing and the lever bracket, with one end bearing against each. A valve control link 645 is connected at one end to the bracket 643, and at its other end to an off-set handle, not here shown, of a valve 616 in the discharge line.

The solenoid 640 is connected to a source of electricity, not here shown, in a circuit which includes an electric switch 632.

In the operation of the embodiment of the washing machine shown in FIGURES 10–12, during the filling period, the switch 632 is closed, energizing the solenoid 640 and retracting the shifter bar 641 against the bias of the spring 644 and the bias of the shifting lever spring. In this position, the valve 616 is closed, as indicated by the stop cock passage shown in FIGURE 10. The shifting lever is in tumble position, and the operation of the pump causes the interlock to drop over the shifting lever to hold it in that position during the tumble period. When the tub is draining, the solenoid switch 632 is opened, which permits the spring 644 to move the movable core of the solenoid to the position shown in FIGURE 11, opening the drain valve 616. However, the water pressure generated by the pump is sufficient to keep the interlock in its interlocking position, shown in FIGURE 11, preventing the shifting lever from moving to spin position until all of the water is out of the tub. When the pump begins sucking air, the pressure in the interlock operating bellows drops, the interlock moves away from the shifting lever under the bias of the interlock spring, and the shifting lever moves to spin position under the bias of the shifting lever spring, as illustrated in FIGURE 12.

Numerous variations in the construction of the washing machine of this invention will occur to those skilled in the art in the light of the foregoing disclosure. For example, several of the features of the various embodiments described can be combined. A separate water pump, with a separate operating motor, can be used. Any number of hydraulic operators can be substituted for the bellows, e.g. diaphragms, bladders, or pistons and cylinders, as long as they respond by mechanical movement to hydraulic pressure. These variations are merely illustrative.

Having thus described the invention, what is claimed and desired to be secured by Letters Patent is:

1. In a washing machine having a filling conduit, a tub for the reception of water, and a drain, all forming parts of a water system for the machine and wherein a driving means is connected to a variable speed transmission and an output shaft from said transmission is connected to drive said washing machine and a mechanical shifting means is operatively connected to said transmission for causing the transmission output shaft to drive the washing machine selectively at one position of the shifting means at tumble speed and at another position of the shifting means at spin speed, the improvement comprising a main hydraulic shifter operatively communicating with said water system to be operated by water in said system, and mechanically coupled to said shifting means to move the shifting means between tumble and spin positions, and interlock operating means connected to a discharge pipe from said tub and mechanically coupled to a mechanical interlock adapted selectively to restrain movement of said shifting means in response to bias of the main hydraulic shifter.

2. The improvement of claim 1 wherein the main hydraulic shifter is connected to the filling conduit.

3. The improvement of claim 1 wherein the washing machine includes a water pump with a suction side connected to said tub to pump water from said tub and a discharge side connected to the discharge pipe, and the interlock operating means is operatively connected to the discharge pipe on the discharge side of the pump.

4. In a washing machine having a filling conduit, a tub for the reception of water, and a drain, all forming parts of a water system for the machine and wherein a driving means is connected to a variable speed transmission and an output shaft from said transmission is connected to drive said washing machine and a mechanical shifting means is operatively connected to said transmission for causing the transmission output shaft to drive the washing machine selectively at one position of the shifting means at tumble speed and at another position of the shifting means at spin speed, the improvement comprising a main hydraulic shifter mediately connected to the filling conduit to receive water therefrom, said main hydraulic shifter being mechanically coupled to said shifting means to move the shifting means between tumble and spin positions, a stand-pipe between and communicating with the filling conduit and the main hydraulic shifter, of a height to provide a head sufficient to move the shifting means to tumble position, and drain valve means in the said main hydraulic shifter for draining said stand-pipe, said drain valve being connected to said tub to communicate with the water therein and including a float arranged to be moved to valve-closing position when there is a predetermined head of water in the tub and to valve-opening position when the head of water falls below said predetermined level.

5. In a washing machine having a filling conduit, a tub for the reception of water, and a drain, all forming parts of a water system for the machine, a water pump with a suction side connected to the tub and a discharge side connected to the drain, and wherein a driving means is connected to a variable speed transmission and an output shaft from said transmission is connected to drive said washing machine and a mechanical shifting means is operatively connected to said transmission for causing the transmission output shaft to drive the washing machine selectively at one position of the shifting means at tumble speed and at another position of the shifting means at spin speed, the improvement comprising hydraulic means operatively communicating with the said water system to be operated by water in said system, said hydraulic means being adapted to control the movement of said shifting means, and an interlock operating means connected to the discharge pipe on the discharge side of said pump to receive water from said pump and mechanically coupled to a mechanical interlock, said mechanical interlock being movable between a position at which it restrains movement of said shifting means to spin position and a position at which it does not restrain said movement and being biased toward said latter position, said interlock operating means being adapted, when water is being pumped, to move the said interlock against said bias to shifting means restraining position.

6. The improvement of claim 5 wherein the shifting means is continuously biased toward spin position and is moved to tumble position by a solenoid.

References Cited
UNITED STATES PATENTS 3,152,461  10/1964  Glover _____ 68—24 X WILLIAM I. PRICE, *Primary Examiner.*